(12) United States Patent
Eder et al.

(10) Patent No.: US 8,632,859 B2
(45) Date of Patent: Jan. 21, 2014

(54) METHOD FOR THE TRANSPARENT COATING OF A SUBSTRATE WITH PLASMA AT ATMOSPHERIC PRESSURE

(75) Inventors: Florian Eder, Erlangen (DE); Rudolf Gensler, Singapore (SG)

(73) Assignee: Siemens Aktiengesellschaft, Munich (DE)

( * ) Notice: Subject to any disclaimer, the term of this patent is extended or adjusted under 35 U.S.C. 154(b) by 488 days.

(21) Appl. No.: 12/733,681

(22) PCT Filed: Aug. 27, 2008

(86) PCT No.: PCT/EP2008/061186
§ 371 (c)(1),
(2), (4) Date: Mar. 15, 2010

(87) PCT Pub. No.: WO2009/037073
PCT Pub. Date: Mar. 26, 2009

(65) Prior Publication Data
US 2010/0213164 A1      Aug. 26, 2010

(30) Foreign Application Priority Data
Sep. 13, 2007   (DE) .......................... 10 2007 043 650

(51) Int. Cl.
H05H 1/00      (2006.01)
(52) U.S. Cl.
USPC ......................................... 427/535; 427/532
(58) Field of Classification Search
USPC ......... 427/164, 165, 169, 488, 489, 491, 498, 427/512, 532, 535, 536, 539
See application file for complete search history.

(56) References Cited

U.S. PATENT DOCUMENTS

| | | | |
|---|---|---|---|
| 4,137,365 A | 1/1979 | Fletcher | |
| 7,462,678 B2 | 12/2008 | Akiyama et al. | |
| 2007/0034157 A1* | 2/2007 | Nakata et al. | 118/723 MW |
| 2008/0079894 A1* | 4/2008 | Matheron et al. | 351/159 |
| 2008/0187765 A1* | 8/2008 | Hilmer et al. | 428/425.6 |

FOREIGN PATENT DOCUMENTS

| | | |
|---|---|---|
| DE | 102 09 667 | 9/2003 |
| DE | 102004029911 A1 | 1/2005 |
| DE | 10 2005 007 825 | 7/2006 |
| EP | 564134 B1 | 12/1999 |
| EP | 0976847 A2 | 2/2000 |
| EP | 1394283 A1 | 3/2004 |
| EP | 1 669 331 | 6/2006 |
| JP | 52-65575 | 5/1977 |
| JP | 6-73208 | 3/1994 |
| JP | 11-335844 | 12/1999 |
| JP | 2002-80970 | 3/2002 |
| JP | 2003-161807 | 6/2003 |
| JP | 2004-107788 | 4/2004 |

(Continued)

OTHER PUBLICATIONS

German Office Action for related German Patent Application No. 10 2007 043 650.7, issued on Jul. 4, 2012.

(Continued)

*Primary Examiner* — Dah-Wei Yuan
*Assistant Examiner* — Nga Leung V Law
(74) *Attorney, Agent, or Firm* — Staas & Halsey LLP

(57) ABSTRACT

The invention relates to a method for improving the properties of coatings on transparent materials by plasma treatment, preferably by an atmospheric pressure plasma.

10 Claims, 3 Drawing Sheets

(56) References Cited

FOREIGN PATENT DOCUMENTS

| | | |
|---|---|---|
| JP | 2005-120355 | 5/2005 |
| JP | 2006-503686 | 2/2006 |
| JP | 2006-098527 | 4/2006 |
| JP | 2007-31550 | 2/2007 |
| JP | 2008-514813 | 5/2008 |
| WO | WO 2006021698 A1 * | 3/2006 |
| WO | WO 2006117325 A1 * | 11/2006 |
| WO | 2006/129461 | 12/2006 |
| WO | 2007/023658 | 3/2007 |
| WO | 2007/096464 | 8/2007 |

OTHER PUBLICATIONS

Yamaguchi et al.: Anti-Reflective Coatings of Flowerlike Aluminia on Various Glass Substrates by the Sol-Gel Process with the Hot Water Treatment; Journal of Sol-Gel Science and Technology, 2005, 33, p. 117-120; Others.

M. Walther: Industrielle Umsetzung der Sol-Gel-Technologie für großflächige Anti Reflex Beschichtungen, OTTI-Seminar Regensburg, Sep. 2005; Others.

Charles E. Ophardt, "Condensation Polymers," Virtual Chembook, Elmhurst College, 2003, http://www.elmhurstedu/~chm/vchembook/402condensepolymers.html, printed Nov. 13, 2012, 3 pages.

"Caveman Chemistry: 28 Projects, from the Creation of Fire to the Production of Plastics, Chapter 28. DuPont (Plastics)," http://www.cavemanchemistry.com/cavebook/chplastic2.html, printed Nov. 13, 2012, 5 pages.

Massimiliano Di Ventra et al., "Thin Film Deposition: Wet Chemical," Introduction to Nanoscale Science and Technology, 2004, 28 pages.

"Research: Wetting of Polymer Films," http://www.markgeoghegan.org/research/wetting.html, printed Nov. 13, 2012, 1 page.

Chinese Office Action for related Chinese Patent Application No. 20880106714.3, issued on Dec. 24, 2012, 8 pages.

* cited by examiner

METHOD FOR THE TRANSPARENT COATING OF A SUBSTRATE WITH PLASMA AT ATMOSPHERIC PRESSURE

CROSS REFERENCE TO RELATED APPLICATIONS

This application is based on and hereby claims priority to PCT Application No. PCT/EP2008/061186 filed on Aug. 27, 2008 and DE Application No. 10 2007 043 650.7 filed on Sep. 13, 2007, the contents of which are hereby incorporated by reference.

BACKGROUND

The present invention relates to the area of transparent materials.

In many transparent materials, especially plastic-based transparent materials, for example polycarbonate etc., the difficulty arises of these materials sometimes having undesired refection properties which make it difficult or even impossible to use them for many applications.

Numerous attempts have thus been made to design transparent materials to be less reflective, especially by applying further coatings to them.

To this end it has been proposed that reflection be reduced by a so-called "flower-like alumina" coating (see Yamaguchi et al, Journal of Sol-Gel Science & Technology, 2005, 33, 117-120). However this approach demands a tempering step at increased temperatures (appr. 400° C.).

Other proposed coatings include multicoat systems with alternating refractive indices, e.g. multicoat systems comprising $SiO_2$ and $TiO_2$. However these also require tempering steps, mostly at temperatures of more than 400° C. (see M. Walther, OTTI Seminar Regensburg, September 2005). Other systems use coatings made of $TiO_2$ and $MgF_2$ (see EP 564 134 B1), in which additional fluorohydrocarbon resins are provided. The disadvantage of this system once again lies in it being hard to apply.

In many examples in accordance with the related art, especially for solidifying and hardening, temperatures of 400° C. and more are needed moreover in order to achieve the desired effects. However many substrates, especially plastics, but also metals are destroyed or attacked or lose specific properties under these conditions. Thus for example a few common plastics, such as PMMA or PC have a long-term usable temperature which does not exceed 100° C. and a few metals and alloys lose their hardness at increased temperature e.g. by transformations in the inner structure.

Furthermore methods such as CVD or PVD exist which require a vacuum and thus make a simple and continuous substrate production difficult.

SUMMARY

One potential object is thus to create a method for handling transparent coatings as well as a transparent coating, especially for a transparent substrate material, which at least partly overcomes the disadvantages discussed above.

The inventors propose a method for handling transparent coatings characterized in that it comprises a plasma treatment.

The term "plasma treatment" within the meaning of this document includes especially all processes and/or methods in which ionized molecules, especially radicals of a gas which have been created by an energy source such as high frequency or microwaves, act on a substrate. This is mostly associated with an increase in temperature.

Surprisingly it has transpired that a significant improvement of the surface quality as well as further properties can be achieved by plasma treatment for many applications for coatings and/or substrates without having any negative influence on the coating or only causing an insignificant deterioration.

One or more of the following advantages can be achieved using the method for many applications.

Expensive vacuum steps can often be omitted which mostly makes the manufacturing of the coating simpler and more cost-effective.

A coating of substrates with a large geometric dimensions can often be greatly simplified by the method.

The energy input to the coating is limited to an amount harmless to the substrate compared to the method in accordance with the related art.

It should be noted that "plasma treatment" within the meaning of this document especially also includes a corona treatment even if this is often handled differently in common parlance. A plasma treatment within the meaning of this document thus explicitly also includes a corona treatment; this in particular represents a preferred embodiment.

In accordance with a preferred embodiment the plasma treatment is undertaken as an atmospheric pressure plasma. This has proved to be very advantageous for many applications.

The term "atmospheric pressure plasma" within the meaning of this document means or comprises in particular all processes and/or methods in which a plasma is applied under atmospheric ambient conditions to the substrate.

Preferably treatment using plasma treatment includes hardening and/or wetting.

In such cases "hardening" is particularly taken to mean that the resistance capability of the coating is increased by plasma-induced reactions (including especially oxidization and/or condensation reactions)

"Wetting" is especially understood as condensation reactions being induced by the plasma treatment on the coating (and/or precursor materials present where necessary).

Preferably the plasma treatment is carried out at a process gas pressure of $\geq 2$ bar to $\leq 8$ bar. This has been shown to be advantageous in many applications.

Preferably the process gas pressure is at $\geq 3$ bar to $\leq 6$ bar, preferably $\geq 3.5$ bar to $\leq 5$ bar.

Preferably the plasma gas treatment is carried out so that the energy yield on the coating amounts to $\geq 50$ W/cm$^2$ to $\geq 250$ W/cm$^2$.

This has been shown to be advantageous for many applications within the present invention since on the one hand the plasma treatment leads to much better results with this method, but on the other hand the stress on the coating and/or the substrate can be minimized.

Preferably the plasma treatment is carried out such that the energy input to the coating amounts to $\geq 100$ W/cm$^2$ to $\leq 200$ W/cm$^2$.

Preferably the plasma treatment is carried out while rotating the nozzle.

In accordance with a preferred embodiment a sol-gel process is carried out before the plasma treatment.

The term "sol-gel process or sol-gel method" within the meaning of this document, means or comprises especially all processes and/or methods in which metal precursor materials, especially metal halogenides and/or metal alkoxides in solution are subjected to a hydrolysis and subsequent condensation.

A preferred embodiment is characterized in that during at least a part of the sol-gel process at least one porosity-causing component is present which is removed and/or destroyed after the ending of the sol-gel process.

Preferably the porosity-causing component is removed and/or destroyed at least in part by the plasma treatment.

A preferred embodiment is characterized in that the at least one porosity-causing component is a polymer with the average mol mass of the polymer preferably amounting to ≥1,000 Da to ≤100,000 Da, more preferably to ≥10,000 Da to ≤50,000 Da.

A preferred embodiment is characterized in that the polymer is an organic polymer preferably selected from the group containing polyethylene glycol, polypropylene glycol, copolymers made from polyethylene glycol and polypropylene glycol, polyvinylpyrrolidone, polyether alkyl, cycloalkyl and/or aryl-substituted polyether, polyester, alkyl, cycloalkyl and/or aryl-substituted polyester, especially polyhydroxybutyrate or mixtures thereof.

General groups/molecule definition: Within this document general groups or molecules, such as for example alkyl, alkoxy, aryl etc. are described. Unless described otherwise, the following groups are preferably used within the generally described groups/molecules.

Alkyl: linear and branched C1-C8 alkyls,

Long-chain alkyls Linear and branched C5-C20 alkyls, alkenyl: C2-C6-alkenyl,

Cycloalkyl: C3-C8 cycloalkyl,

Alkoxide/alkoxy: C1-C6-alkoxy, linear and branched

Long-chain alkoxide/alkoxy: Linear and branched C5-C20 alkoxy

Aryl: selected from aromatics with a molecular weight below 300 Da.

Polyether: selected from the group containing $H\text{-}(O\text{-}CH_2\text{-}CH(R))_n\text{-}OH$ and $H\text{-}(O\text{-}CH_2\text{-}CH(R))_n\text{-}H$ with R being selected independently from: Hydrogen, alkyl, aryl, halogen and n from 1 to 250

Substituted polyether: selected from the group containing $R_2\text{-}(O\text{-}CH_2\text{-}CH(R_1))_n\text{-}OR_3$ and $R_2\text{-}(O\text{-}CH_2\text{-}CH(R_2))_n\text{-}R_3$ with R1, R2, R3 being selected independently from: hydrogen, alkyl, long-chain alkyls, aryl, halogen and n amounting to between 1 and 250

Ether: The compound $R_1\text{-}O\text{-}R_2$, with each $R_1$ and $R_2$ being selected independently from the group containing hydrogen, halogen, alkyl, cycloalkyl, aryl, long-chain alkyl Unless stated otherwise the following groups/molecules are more preferred groups/molecules within the general group/molecule definition Alkyl: linear and branched C1-C6 alkyl, Alkenyl: C3-C6 alkenyl, Cycloalkyl: C6-C8 cycloalkyl, Alkoxy, alkoxide: C1-C4 alkoxy, especially isopropyl oxide long-chain alkoxy: linear and branched C5-C10 alkoxy, preferably linear C6-C8 alkoxy Polyether: selected from the group containing $H\text{-}(O\text{-}CH_2\text{-}CH(R))_n\text{-}OH$ and $H\text{-}(O\text{-}CH_2\text{-}CH(R))_n\text{-}H$ with R being selected independently from: hydrogen, alkyl, aryl, halogen and n amounting to between 10 and 250.

Substituted polyether: selected from the group containing $R_2\text{-}(O\text{-}CH_2\text{-}CH(R1))_n\text{-}OR_3$ and $R_2\text{-}(O\text{-}CH_2\text{-}CH(R_2))_n\text{-}R_3$ with $R_1$, $R_2$, $R_3$ being selected independently from: hydrogen, alkyl, long-chain alkyls, aryl, halogen and n being between 10 and 250.

The inventors also propose a transparent coating treated in accordance with the proposed method.

The term "transparent" within the meaning of this document means or comprises in such cases especially a transparency of ≥90% in the respective wavelength range used, especially in the visible wavelength range.

Using the proposed coating in one of many applications allows one or more of the following advantages to be achieved:

The coating is essentially homogenous for the human eye and the many applications a single coating is sufficient (unlike the multilayer systems cited above).

The thickness of the coating produced (or with "multilayer coatings" of the individual sublayers in each case) is in the range—as will be described below—for many applications of ≥50-≥500 nanometers. It is thus largely insensitive to thermal and mechanical stress (especially bending stress) and only has an insignificant influence on component dimensions and tolerances.

Preferably the coating is based on metal oxides, preferably $SiO_2$/or $TiO_2$.

The term "based on metal oxide" within the meaning of this document means or comprises especially that the coating contains this metal oxide (after the method has been carried out) as its main component. Preferably in such cases ≥70%, more preferably ≥80% and most preferably ≥90% to ≥100 of the coating consists of metal oxide.

In accordance with a preferred embodiment the coating includes a plurality of layers and/or the coating is a multilayer coating.

"Multilayer coating" is particularly understood as the coating being applied in layers to a substrate, with a plasma treatment being carried out if necessary after the application of one layer. Preferably the plasma treatment is undertaken after each application of a layer.

Preferably the coating is what is referred to as a "3-layer coating" or "multilayer coating".

A preferred embodiment is characterized in that the coating is essentially a porous molded body, especially a homogeneous, porous molded body, or forms such a body.

The term "essentially" in such cases refers especially to ≥90 vol-%, preferably ≥95 vol-% of the coating.

For many applications this means that a simple-to-produce and even more anti-reflection coating can be achieved.

A preferred embodiment is characterized by the coating having transmission-increasing properties, especially for light in the visible wavelength range.

Preferably the coating is able to increase the transmission of the substrate by ≥2%, preferably by ≥4% in the respective wavelength range used, especially in the visible wavelength range.

The inventors also propose to a transparent coating for a transparent substrate, produced in accordance with the method.

A preferred embodiment is characterized by the substrate being selected from the group containing glass, transparent plastics, preferably selected from the group containing polycarbonate, polyacryl, PET, PEN, PES, PSU, metals, transparent duroplastic masses, especially epoxide and acrylate and mixtures thereof, and also mixtures thereof.

It should be pointed out in particular that it was possible the first time to apply a 3-layer coating (as illustrated in the example below) with good optical and mechanical properties to a polycarbonate and/or PMMA substrate.

The inventors also propose an optical component comprising a transparent substrate as well as to a coating applied and/or arranged on the substrate.

The inventors also propose a method for manufacturing an optical component, characterized in that the coating is applied to the substrate by dipping and/or spin coating and is subsequently subjected to a plasma treatment.

The inventors also propose the use of the coating and/or of an the optical component for
Optical, instruments
Eyeglasses
Headlight housings in automotive engineering
Windows, especially in automotive engineering
Cockpit glass
Signs
Auto mirrors
Solar cells, especially flexible solar cells
The components to be used are not subject in their size, design, choice of materials and technical conception to any particular exceptional conditions so that the selection criteria known in the area of application can be used without restriction.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
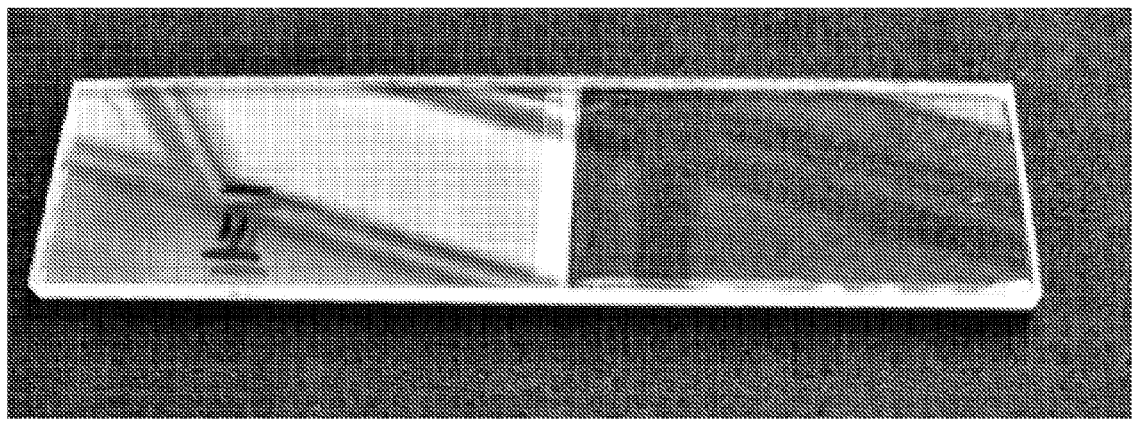
FIG. 1 shows a polycarbonate substrate half coated in accordance with an example.

Reference will now be made in detail to the preferred embodiments of the present invention, examples of which are illustrated in the accompanying drawings, wherein like reference numerals refer to like elements throughout.

FIG. 1 relates to an example, which—purely illustratively—underscores the advantages of the method as well as the coating with reference to a 3-layer coating by way of example.

To this end a three-layer anti-reflection-coating has been applied to an approximately 3 mm thick polycarbonate substrate.

Initially the substrate was cleaned (IPA with ultrasound, then rinsing with de-ionized water) as well as being pretreated itself with atmospheric pressure plasma, in order to improve the wetting of the coating solution. A device made by Plasmatreat with a high frequency generator FG 3001 and a rotation nozzle RD 1004, which was equipped with a Type AGR123 nozzle head was used.

Compressed air was selected as the process gas; the distance of the sample from the nozzle amounted to 8 mm. A movement speed of 2 cm/sec was set.

Subsequently, using dip coating, initially a silicon/titanium dioxide layer (layer 1) then titanium dioxide layer (layer 2) as well as finally a silicon dioxide layer (layer 3) was applied.

In this case the silicon oxide sol H2000 and the titanium oxide sol H 9005 marketed by FEW-Chemicals were used. For layer 1 a 1:1 (vol.) mixture of the two sols was used.

The sols were applied by dip coating. Subsequently the sample was dried for 20 minutes at 100° C. and a plasma treatment as described above was carried out.

Overall a thickness of 80 nm (layer 1), 130 nm (layer 2) and 90 nm (layer 3) was found.

FIG. 1 shows the polycarbonate substrate with the coating (right half). The reduction in reflection and can clearly be seen.

To measure the increase in the mechanical stability from the method a scratch test (see method part) was carried out.

In this test three object carriers (wafer fragments) were covered by dip coating with titanium oxide sol with a layer approximately 130 nm thick.

Subsequently one object carrier (comparison example 1) remained untreated and one object carrier (comparison example 2) was air dried at 100° C. for 20 min.

The third object carrier (example 2) was initially dried at 100° C. for 20 min and subsequently subjected to a plasma treatment as described above.

Figure 2:
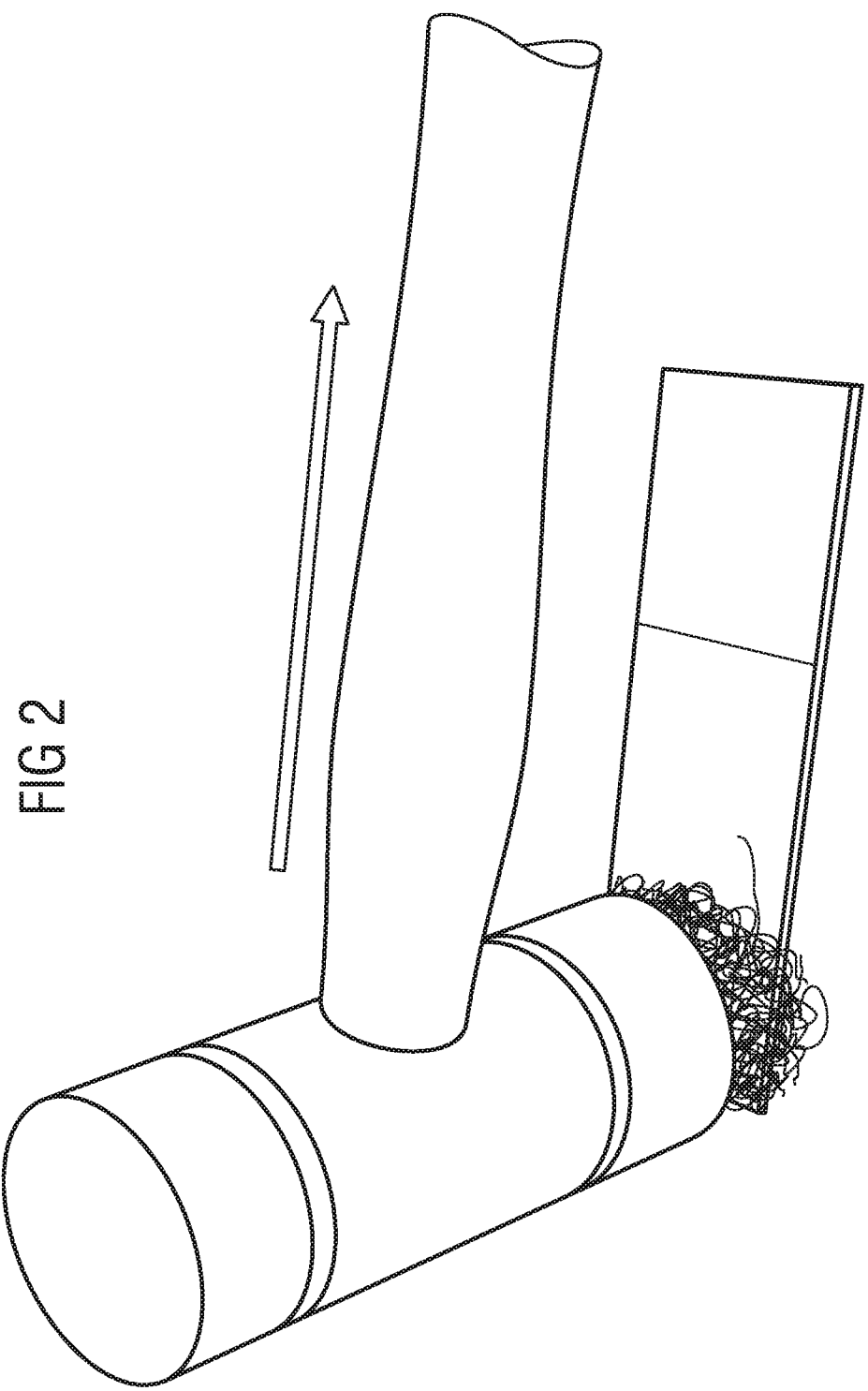
FIG. 2 is a diagram of a scratch test for measuring scratch resistance.

Subsequently all three object carriers were subjected to a scratch test (see method part). FIG. 2 shows a photo taken while this test was being carried out.

Figure 3:
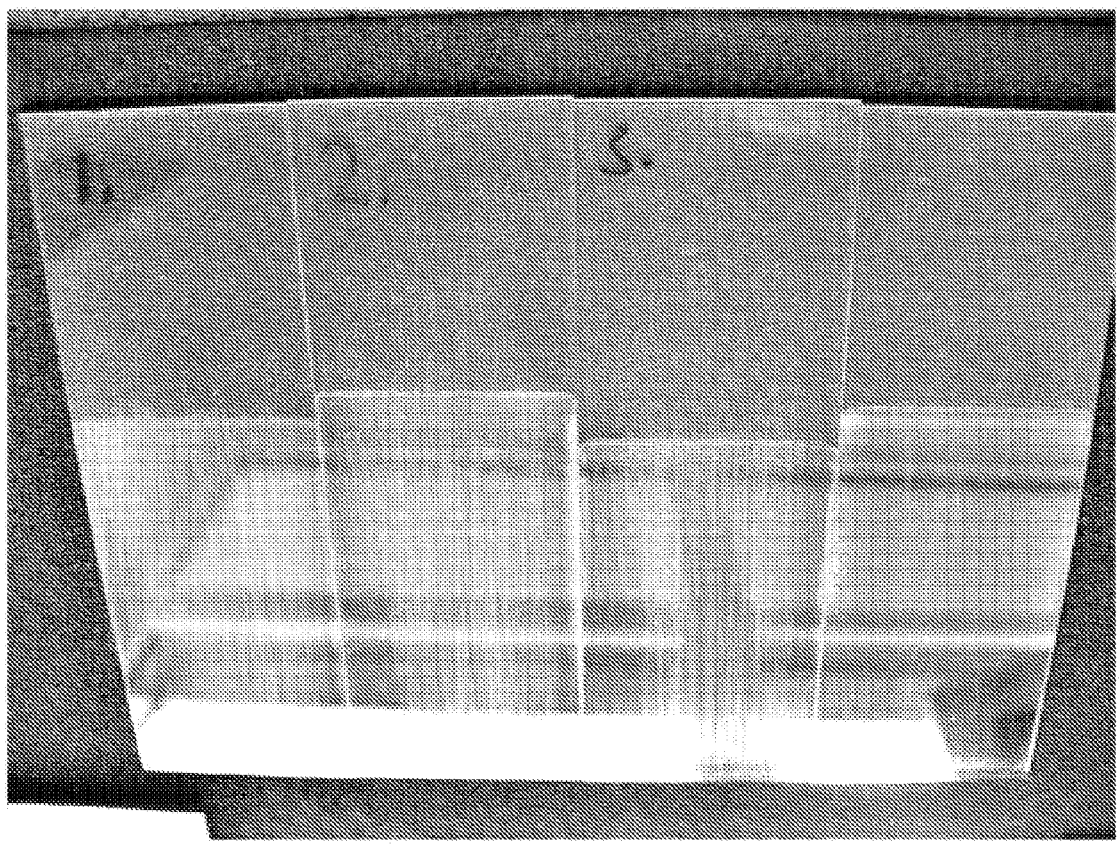
FIG. 3 shows three object carriers relating to comparison examples and a proposed example after carrying out the scratch test.

The results of the test are to be seen in table 1 and also in FIG. 3.

In this case FIG. 3 (from left to right) shows the object carrier according to comparison example 1 and 2 as well as example 2 (the fourth object carrier was an additional control which was not evaluated).

| Test | Comparison example 1 (untreated) | Comparison example 2 (dried for 20 minutes at 100° C.) | Example 2 (plasma treatment) |
|---|---|---|---|
| Refractive index/ Increase in the index | 1.676 (reference value) | 1.844 (+10%) | 1.91 (+14%) |
| Transmission | 85.1 | 86.8 | 86.7 |
| Haze/increase in scratch resistance | 22.7 (reference value) | 15 (+151%) | 8.49 (+267%) |

It can thus clearly be seen that in particular the scratch resistance can once again be clearly improved by the method.
Materials and Methods
Scratch Test/Haze
The mechanical stability of the coatings was measured in the following manner:
A hammer weighing 180 g, on one end of which a piece of steel wool (type 00 equals very fine) was attached by adhesive tape, was pulled over each side of the sample 4 times without further vertical force effect over the respective coating. The pull direction is especially shown in FIG. 2.

Subsequently transmission and haze of the coating were measured in "Haze Guard PLUS" (made by Byk-Gardner).

The lower the haze value the higher the scratch resistance.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:
1. A method comprising:
applying a transparent coating to a transparent substrate by forming a plurality of transparent coating layers on the transparent substrate, the forming of each transparent coating layer each comprising:
dipping the transparent substrate in a solution comprising a porosity-causing polymer component and a metal com- ponent, thereby forming on the transparent substrate a coating layer comprising the solution;

subjecting the coating layer the porosity-causing polymer component and the metal component to hydrolysis and condensation reactions to form a reaction product including a metal oxide; and applying atmospheric plasma treatment to the coating to induce hardening of the coating layer, to induce condensation in the coating layer, and to remove at least a portion of the porosity-causing polymer component from the reaction product, wherein the porosity-causing polymer component has an average molecular weight of 10,000 to 50,000 Da, the plasma treatment is carried out so that the energy input to the transparent coating is from 50 W/cm$^2$ to 250 W/cm$^2$, and the plasma treatment is performed at a process gas pressure of from 2 bar to 8 bar, using a rotating nozzle.

2. The method as claimed in claim 1, wherein the plasma treatment is carried out at a process gas pressure of from 3.5 bar to 5 bar.

3. The method as claimed in 1, wherein the transparent substrate is formed of at least one material selected from the group consisting of glass, transparent plastics metals, and transparent duroplastic masses.

4. The method as claimed in claim 1, wherein the transparent substrate is formed of at least one material selected from the group consisting of glass, polycarbonates, polyacryls, polyethylene terephthalate, polyethylene naphthalates, cyclic olefin copolymers, polyethersulfones, polysulfones, metals, epoxide transparent duroplastics and acrylate transparent duroplastics.

5. The method as claimed in claim 1, wherein the coating is a 3-layer anti-reflection coating.

6. The method as claimed in claim 1, wherein
the metal component is selected from the group consisting of metal halogenides and metal alkoxides, and
the metal in the metal component is at least one of silicon and titanium.

7. The method as claimed in claim 1, wherein the plasma treatment is performed at a process gas pressure of from 3.5 bar to 5 bar, using a rotating nozzle and a treatment energy of from 100 to 200 W/cm$^2$.

8. The method as claimed in claim 1, wherein the porosity-producing polymer component is selected from the group consisting of polyethylene glycol, polypropylene glycol, copolymers made from polyethylene glycol and polypropylene glycol, polyvinylpyrrolidone, alkyl-substituted polyether, cycloalkyl-substituted polyether, aryl-substituted polyether, polyester, alkyl-substituted polyester, cycloalkyl-substituted polyester, aryl-substituted polyester and mixtures thereof.

9. The method as claimed in claim 1, wherein the plasma treatment is carried out at a treatment energy of from 100 to 200 W/cm$^2$.

10. The method as claimed in claim 1, where the subjecting the coating layer to hydrolysis and condensation is performed by a sol-gel process.

* * * * *

UNITED STATES PATENT AND TRADEMARK OFFICE
CERTIFICATE OF CORRECTION

PATENT NO. : 8,632,859 B2  Page 1 of 1
APPLICATION NO. : 12/733681
DATED : January 21, 2014
INVENTOR(S) : Eder et al.

It is certified that error appears in the above-identified patent and that said Letters Patent is hereby corrected as shown below:

In the Claims

In Column 6, Line 65, In Claim 1, after "layer" delete "each".
In Column 7, Lines 3-4, In Claim 1, after "layer" delete "the porosity-causing polymer component and the metal component".
In Column 7, Line 23, In Claim 3, delete "in 1," and insert -- in claim 1, --, therefor.

Signed and Sealed this
Twenty-ninth Day of April, 2014

Michelle K. Lee
*Deputy Director of the United States Patent and Trademark Office*